(12) United States Patent
Musat et al.

(10) Patent No.: US 11,402,631 B2
(45) Date of Patent: Aug. 2, 2022

(54) MOTOR VEHICLE CONTROL MEMBER, ASSOCIATED CONTROL DEVICE AND METHOD

(71) Applicant: VALEO COMFORT AND DRIVING ASSISTANCE, Créteil (FR)

(72) Inventors: Ciprian Musat, Creteil (FR); Stephane Korczak, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 99 days.

(21) Appl. No.: 17/052,654

(22) PCT Filed: Apr. 8, 2019

(86) PCT No.: PCT/EP2019/058798
§ 371 (c)(1),
(2) Date: Nov. 3, 2020

(87) PCT Pub. No.: WO2019/211064
PCT Pub. Date: Nov. 7, 2019

(65) Prior Publication Data
US 2021/0239974 A1 Aug. 5, 2021

(30) Foreign Application Priority Data
May 4, 2018 (FR) ...................................... 1853899

(51) Int. Cl.
*G02B 27/01* (2006.01)
*G02F 1/163* (2006.01)
(Continued)

(52) U.S. Cl.
CPC ..... *G02B 27/0101* (2013.01); *G02B 27/0149* (2013.01); *G02F 1/163* (2013.01);
(Continued)

(58) Field of Classification Search
CPC ............ G02B 27/0101; G02B 27/0149; G02B 2027/014; G02B 2027/0154; G02F 1/163;
(Continued)

(56) References Cited

U.S. PATENT DOCUMENTS 5,936,613 A * 8/1999 Jaeger ................... G06F 3/0238
345/184
8,292,228 B2 10/2012 Mitchell et al.
(Continued)

FOREIGN PATENT DOCUMENTS

FR 2923184 A * 5/2009
FR 2923184 A1 5/2009
(Continued)

OTHER PUBLICATIONS

International Search Report and Written Opinion corresponding to International Application No. PCT/EP2019/058798, dated Jun. 11, 2019 (10 pages).

*Primary Examiner* — Brent D Castiaux
(74) *Attorney, Agent, or Firm* — Osha Bergman Watanabe & Burton LLP

(57) ABSTRACT

The invention concerns a motor vehicle (1) control member (3) comprising: —a gripping element (6) that can be operated by a user in order to implement a control, such as the control of an element installed onboard said vehicle (1), the gripping element (6) being mounted so as to be able to rotate on a guide (12) of the control member (3), and —an encoder (9) configured to deliver a signal that depends on the position or the variation in position of the gripping element (6), characterised in that the guide (12) is configured to be attached to a window (4) of the motor vehicle (1), such as a front windscreen (8), rear windscreen, side window or sunroof, or to a rear-view mirror inside said vehicle (1). The invention further relates to an associated control method.

22 Claims, 3 Drawing Sheets

(51) Int. Cl.
*G06F 3/0362* (2013.01)
*G05G 1/08* (2006.01)

(52) U.S. Cl.
CPC ............. *G05G 1/08* (2013.01); *G06F 3/0362* (2013.01); *G02B 2027/014* (2013.01); *G02B 2027/0154* (2013.01)

(58) Field of Classification Search
CPC . G05G 1/08; G06F 3/0362; B60J 3/04; G05B 15/02
See application file for complete search history.

(56) References Cited

U.S. PATENT DOCUMENTS

| | | | | |
|---|---|---|---|---|
| 2014/0042004 | A1* | 2/2014 | Tseng | G06F 3/0362 200/336 |
| 2016/0039271 | A1* | 2/2016 | Okamoto | B60J 1/002 296/96.19 |
| 2018/0093611 | A1* | 4/2018 | Kim | B60K 35/00 |

FOREIGN PATENT DOCUMENTS

| | | |
|---|---|---|
| TW | 201407437 A | 2/2014 |
| WO | 2017168010 A1 | 10/2017 |

* cited by examiner

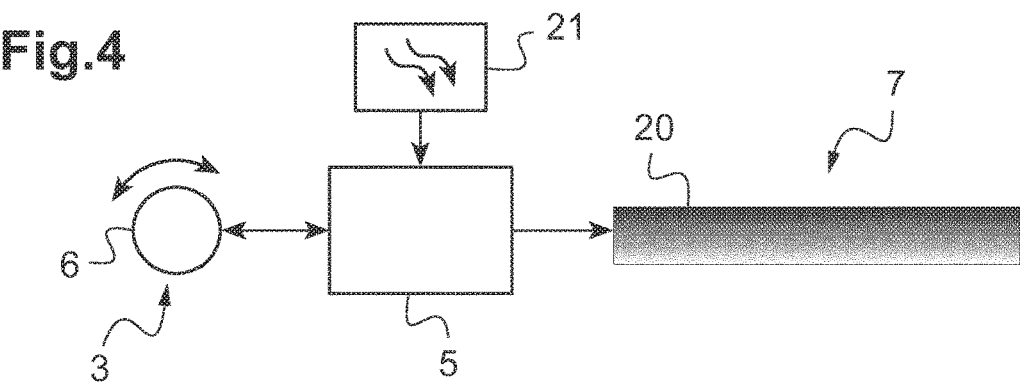
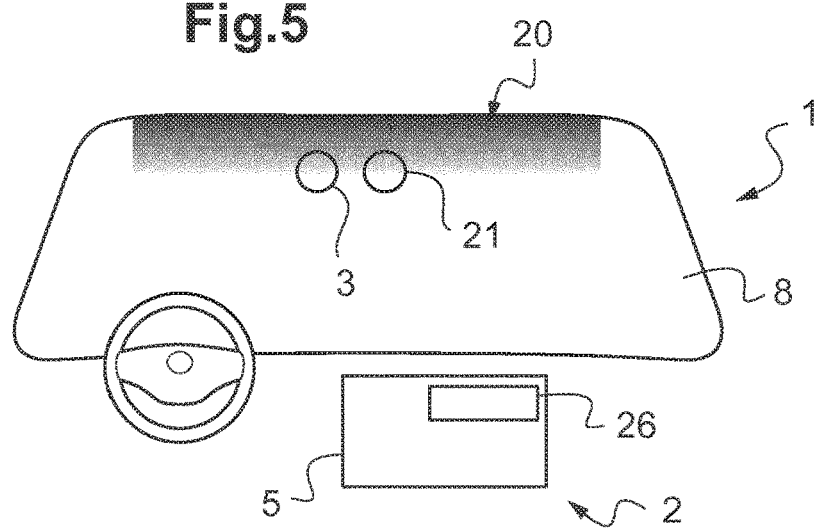
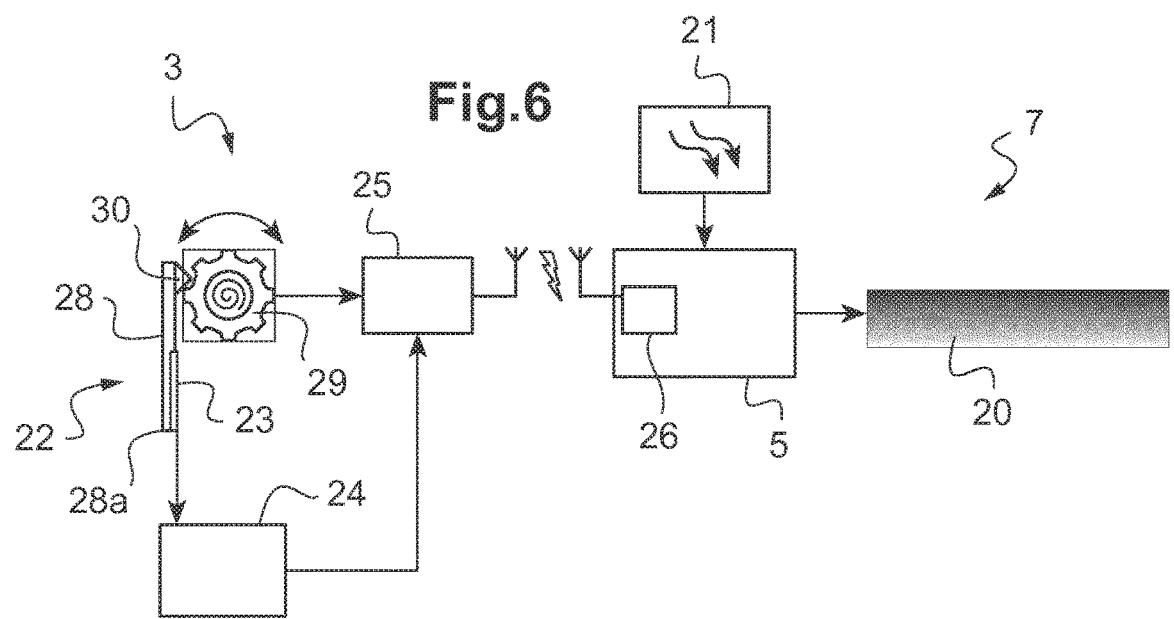

MOTOR VEHICLE CONTROL MEMBER, ASSOCIATED CONTROL DEVICE AND METHOD

The present invention relates to a motor-vehicle control mechanism, and to an associated control device and method.

In the automotive field, control of electrical components, such as the air-conditioning or navigation system, is generally achieved by means of a mechanical control mechanism. The latter for example comprises a thumbwheel, the angular positioning of which allows a processing unit to select a particular command and to control, for example, a shutter actuator in the air conditioning system, or allows the user to access the input keyboard for entering a destination into the navigation system.

The control mechanisms are arranged in the cockpit of the passenger compartment within easy reach of the driver, on the steering wheel, the front panel, the ceiling-light module, the center console or the doors.

However, the increase in the number of buttons in the passenger compartment may lead to a situation in which the attention of the driver becomes spread too thinly. It may sometimes be difficult to know which button is intended to control which on-board system, especially with the proliferation of functions able to be controlled by users. This may result in excessively long periods of inattention on the part of the driver, which may be a source of dangerous driving behaviors.

One aim of the present invention is to provide a control mechanism for controlling certain functions, which mechanism may be located intuitively by the user.

To this end, the invention relates to a motor-vehicle control mechanism, comprising:

a gripping element that may be manipulated by a user to achieve control, such as control of an on-board element of said vehicle, the gripping element being mounted so as to be able to rotate on a guide of the control mechanism, and an encoder configured to deliver a signal that is dependent on the position or on the variation in position of the gripping element, characterized in that the guide is configured to be fastened to a glazing of the motor vehicle, such as a windshield or rear window, a side window or a glazed roof, or to an internal rear-view mirror of said vehicle.

The control mechanism may thus be located intuitively by the user. The control mechanism may be used to control an element located on board the vehicle, which element is related to the glazing or the mirror to which it is fastened, for example with regard to what may be seen through the glazing or on the glazing.

According to one exemplary embodiment, the gripping element forms a cover covering the encoder and the guide. The cover for example has the shape of a bell with a substantially flat top and cylindrical side walls.

The gap between the end of the gripping element and the glazing or the internal rear-view mirror to which the control mechanism is fastened is for example less than live millimeters, such as less than four millimeters, such as between two and four millimeters.

The control mechanism may comprise an energy-harvesting means configured to harvest the kinetic energy generated by the movement of the gripping element in the form of electrical energy with a view to powering a component of the control mechanism.

The component for example comprises a transmitter connected to the encoder for transmitting, via a wireless link, a signal relating to the position of the gripping element to a receiver of a control unit of the motor vehicle.

The energy-harvesting means may comprise an electromechanical transducer, such as a piezoelectric element.

The electromechanical transducer may be connected to an energy storage unit of the control mechanism.

The transmitter may comprise a device for triggering transmission, said device being connected to the electromechanical transducer.

The wireless (radio or infrared) link between the control unit and the encoder allows the control mechanism to be able to be placed anywhere on the glazing or the mirror of the vehicle without a visible wired connection. Furthermore, this allows the control mechanism to be movable. To this end, the control mechanism may comprise a means for removably fastening it to the glazing or to the mirror of the motor vehicle, such as a suction cup.

According to one exemplary embodiment, the energy-harvesting means comprises an elastic blade bearing a piezoelectric element of the electromechanical transducer, a first end being fastened and a free second end being configured to interact with a cam that rotates as one with the gripping element.

According to another example, the control mechanism is connected to a control unit of the motor vehicle control via a wired link, which for example is transparent or translucent.

The guide of the control mechanism may also be adhesively bonded to the glazing or the mirror of the motor vehicle.

The invention also relates to a motor-vehicle control device characterized in that it comprises:

at least one control mechanism such as described above, the guide of which is configured to be fastened to a glazing of the motor vehicle or to an internal rear-view mirror of the motor vehicle, and a control unit that is connected to said at least one control mechanism with a view to controlling an on-board element of said vehicle.

The guide of the control mechanism is for example configured to be fastened to a glazing or a mirror comprising an electrochromic glass, the control unit being configured to control the adjustment of the opacity of the electrochromic glass depending on the manipulation of the control mechanism.

The control device may comprise a brightness sensor configured to measure the brightness in the passenger compartment of the motor vehicle, the brightness sensor being arranged behind an electrochromic glass of a sun visor and connected to the control unit with a view to automatically controlling the opacity of the sun visor.

The guide of the control mechanism may be configured to be fastened to the windshield of the motor vehicle with a view to selection or validation of a function or of a parameter displayed on a screen. The screen may be projected onto said windshield by a head-up display of the control device.

The control device may comprise an on-board element configured to be controlled by the control mechanism, the on-board element comprising an air-conditioning, ventilation or navigation system or a vehicle radio, a telephone or a means for controlling electric windows or for adjusting the position of the rear-view mirrors or for adjusting the height of the headlights or for adjusting the brightness of the screens of the vehicle.

The on-board element may be temporarily on board the vehicle.

The invention also relates to a method for controlling an on-board element of the motor vehicle, characterized in that an on-board element of said vehicle is controlled by manipulating a control mechanism such as described above, the guide of which is fastened to a glazing of the motor vehicle, such as a windshield or rear window, a side window or a glazed roof, or to an internal rear-view mirror of said vehicle.

According to an exemplary embodiment, a component of the control mechanism is powered by the electrical energy harvested from the kinetic energy generated by the movement of the gripping element.

The electrical energy for example powers a transmitter for transmitting, via a wireless link, the position of the gripping element of the control mechanism to a receiver of the control unit of the motor vehicle.

Transmission of the signal may be triggered when the gripping element of the control mechanism is manipulated.

The manipulation of the control mechanism may control the opacity of an electrochromic glass of a glazing of the motor vehicle or of the internal rear-view mirror to which the control mechanism is fastened.

The manipulation of the control mechanism may allow access to a network, such as a network of an electronic-toll, parking-payment or telephone operator, through a glazing to be controlled.

Further features and advantages of the invention will emerge from the following description, given by way of example and in no way limiting, with reference to the appended drawings, in which:

FIG. 4 shows a schematic view of operation of the control device of FIG. 1.

FIG. 5 shows a similar view to FIG. 1 for a second exemplary embodiment of a control device.

FIG. 6 shows a schematic view of operation of the control device of FIG. 5.

In these figures, identical elements bear the same reference numbers.

The following embodiments are examples. Although the description refers to one or more embodiments, this does not necessarily mean that each reference relates to the same embodiment, or that the features apply only to a single embodiment. Individual features of various embodiments may also be combined or interchanged in order to create other embodiments.

Figure 1:
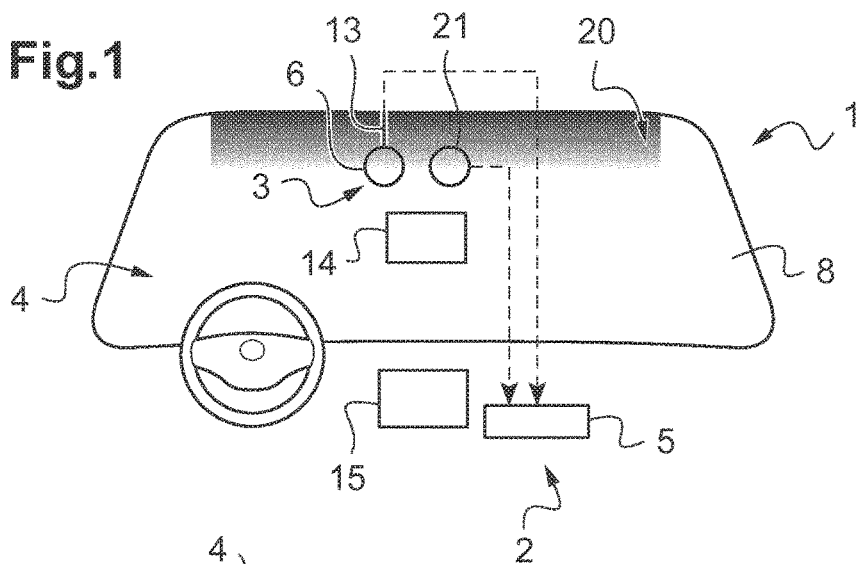
FIG. 1 shows a schematic view of a first exemplary embodiment of a control device arranged in a motor vehicle, as seen from inside the passenger compartment.

FIG. 1 shows a schematic view of a front of a passenger compartment of a motor vehicle 1, in which a control device 2 is arranged.

The control device 2 comprises at least one control mechanism 3 configured to be fastened to a glazing 4 of the motor vehicle 1 or to an internal rear-view mirror of the motor vehicle and a control unit 5 connected to the control mechanism 3. The glazing 4 is for example a windshield 8 (FIG. 1) or rear window, a side window or a glazed roof.

The control mechanism 3 comprises a gripping element 6 that may be manipulated by a user to achieve control, such as control of an on-board element 7 of the vehicle (FIG. 4).

The on-board element 7 of the vehicle 1 for example comprises an air-conditioning, ventilation or navigation system or a vehicle radio, a telephone or a means for controlling electric windows or for adjusting the position of the rear-view mirrors or the height of the headlights or the brightness of the screens of the vehicle 1, or indeed an electrochromic glass of a sun visor or of an internal rear-view mirror, as will be seen below.

Figure 2:
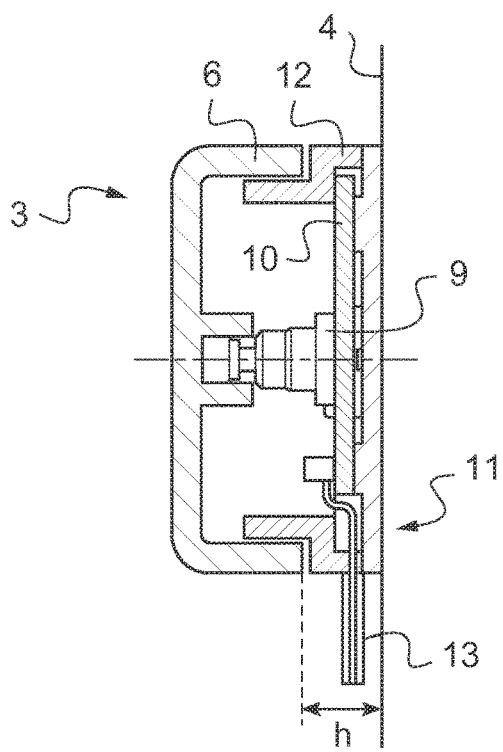
FIG. 2 shows a cross-sectional view of an exemplary embodiment of a control mechanism of the control device of FIG. 1.

The gripping element 6 is rotatabiy mounted on a guide 12 intended to be fastened to the glazing 4 or to the internal rear-view mirror (FIG. 2).

According to one exemplary embodiment, shown in FIG. 2, the gripping element 6 forms a cover covering an encoder 9 and the guide 12 of the control mechanism 3. The cover for example has the shape of a bell with a substantially flat top and cylindrical side walls.

The gap h located between the end of the gripping element 6 and the glazing 4 to which the control mechanism 3 is fastened, i.e. here between the end of the cylindrical side walls and the glazing 4, is for example less than five millimeters, such as less than four millimeters, such as between two and four millimeters.

The control unit 5 comprises a programmable computing unit and a memory unit capable of storing, for example, look-up tables or laws that for example provide a correspondence between a handling characteristic of the gripping element 6 of the control mechanism 3, such as its position or an applied force, and controls, such as controls of an on-board element 7 of the vehicle 1.

The encoder 9 is configured to deliver a signal that is dependent on the position or on the variation in position of the gripping element 6 (FIG. 2). It may employ a magnetic, optical, resistive or switch technology.

FIG. 2 thus shows an example of a control mechanism 3 comprising a rotary switch-type encoder 9 that has a pivoting head on which the gripping element 6 is mounted. The outputs of the encoder 9 are connected to a circuit board 10, such as a PCB, of the control mechanism 3, this board being held by a holder 11 of the guide 12, the circuit board 10 for example bearing the encoder 9.

The control mechanism 3 may also comprise a haptic feedback device that allows the user to be informed that an action has been imparted without the user needing to look away from the road. The haptic feedback device may be a mechanical mechanism or a "programmable" device. It is for example integrated into the encoder 9.

The control mechanism 3 may further comprise a force sensor configured to measure a parameter representative of an applied force exerted on the gripping element 6. The force sensor is for example a capacitive sensor configured to measure a distance between the gripping element 6 and the circuit board 10. The applied force may also be measured by other means such as by inductive measurement or by ultrasonic measurement or by measurement of deformation by means of strain gauges or FSR sensors (FSR being the acronym of Force Sensing Resistor).

According to a first exemplary embodiment, the control mechanism 3 is connected to the control unit 5 by a wired link (FIGS. 1 and 2).

The guide 12 of the control mechanism 3 may be permanently fastened to the glazing 4 or to the internal rear-view mirror, for example by adhesive bonding.

The control mechanism 3 is connected to the control unit 5 with a view to powering the encoder 9 and receiving information on the position of the gripping element 6 via the wired link 13, which may be digital or analog. The control unit 5 for example interprets a signal from the encoder 9 indicating a movement of the gripping element 6 in one direction as an increment and a movement of the gripping element 6 in the opposite direction as a decrement of the signal.

The wired link 13 may be transparent or translucent. It is for example a conductor made of ITO (indium tin oxide) or polyTC® or graphene or AZO or GZO or IZO or nanotubes, inter alia.

The control unit 5 is for example arranged in the dashboard of the vehicle or in any place in the passenger compartment where it may be concealed. The transparent or translucent wired link 13 between the control unit 5 and the encoder 9 allows the control mechanism 3 to be able to be placed anywhere on the glazing 4 of the vehicle without there being a visible wired connection connecting it to the control unit 5.

The on-board element 7 controlled by the control mechanism 3 may be related to the glazing 4 to which the control mechanism 3 is fastened, for example with regard to what may be seen through the glazing 4 or on the glazing 4.

The control mechanism 3 is for example fastened to the windshield 8 and allows selection or validation of a function or a parameter displayed on a screen 14.

The screen 14 may be projected onto the windshield 8 by a head-up display 15 (or HUD) of the control device 2 of the vehicle 1. Such a head-up display 15 displays images on the windshield 8 in the field of vision of the driver. The manipulation of a control mechanism 3 fastened to the windshield 8 to navigate through the images displayed on this windshield 8, allowing on-board elements 7 of the vehicle 1 to be controlled, is relatively intuitive for the driver.

The screen 14 may also be integrated into the dashboard.

The manipulation of the control mechanism 3 may allow a network, such as the network of an electronic-toll operator for paying a freeway toll or of a parking-payment operator or such as a telephone network, to be accessed through the glazing 4. The possible options are for example displayed on the screen 14 in a menu and the rotation of the control mechanism 3 makes it possible to scroll through the various possible options. The choice may be validated by pressing on the control mechanism 3 in a direction parallel to the axis of rotation or on a central button on the control mechanism 3.

Figure 3:
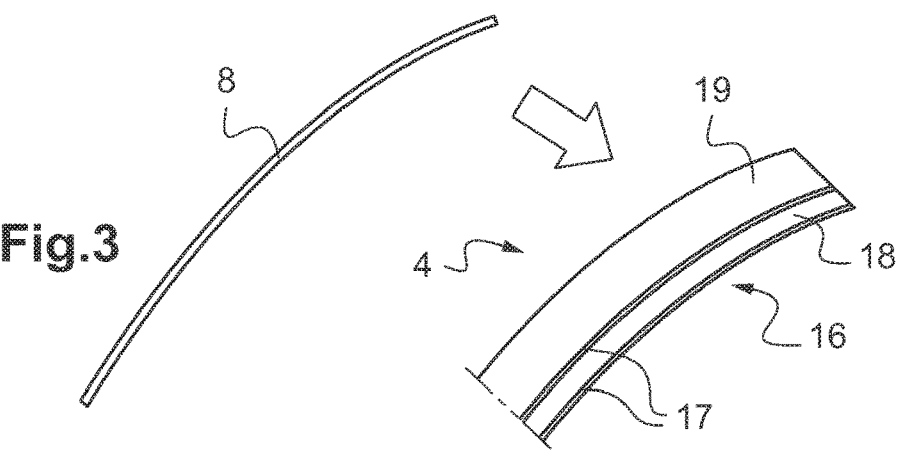
FIG. 3 shows a schematic cross-sectional view of a windshield of the vehicle of FIG. 1 and an enlarged schematic view of a detail of the windshield in the vicinity of a sun visor.

In the exemplary application shown in FIGS. 1 and 3, the guide 12 of the control mechanism 3 is fastened to a glazing 4 or a mirror comprising an eiectrochromic glass 16 and the control unit 5 is configured to control the adjustment of the opacity of the eiectrochromic glass 16 depending on the manipulation of the control mechanism 3.

According to one exemplary embodiment schematically shown in FIG. 3, the eiectrochromic glass 16 comprises two transparent conductors 17 sandwiching a layer of eiectrochromic elements 18 that darkens when it is passed through by a current. The eiectrochromic glass 16 may be integrated into the glass 19 or may be arranged against the glass 19, on the interior side of the vehicle. When it is dark, the electrochromic glass 16 allows the driver and/or the front passenger not to be dazzled.

The electrochromic glass 16 is for example that of a sun visor 20, such as the sun strip of the windshield 8 (FIG. 1), or a sun visor 20 of side windows, of a rear window or of a glazed roof of the vehicle 1, or such as the electrochromic glass 16 of an internal rear-view mirror. The manipulation of a control mechanism 3 fastened to a glazing 4 or to the mirror in order to control the adjustment of the opacity of the eiectrochromic glass 16 to which it may be fastened is relatively intuitive.

The opacity of the electrochromic glass 16 may be controlled in association with a brightness sensor 21 of the control device 2 (FIGS. 1 and 4). The brightness sensor 21 is for example based on a semiconductor or photoresistive technology.

The brightness sensor 21 is configured to measure the brightness in the passenger compartment of the motor vehicle 1. It is placed behind the electrochromic glass 16 of the sun visor 20. Thus arranged between the driver or the passenger and the sun visor 20, the brightness sensor 21 gives a measurement of the light transmitted in the direction of the driver or the passenger.

The brightness sensor 21 is connected to the control unit 5 with a view to automatically controlling the opacity of the sun visor 20, for example according to an opacity setpoint set by manipulating the control mechanism 3 (FIG. 4).

Thus, for example, to control the adjustment of the opacity of the electrochromic glass 16, the tables or laws stored in the control unit 5 include a correspondence between information on ambient light level, as delivered by the brightness sensor 21, information relating to the position of the gripping element 6, and the current to be delivered to the layer of electrochromic elements 18 of the electrochromic glass 16 to adapt the opacity of the sun visor 20.

In operation, the control unit 5 receives information from the brightness sensor 21, from the encoder 9 and/or from the force sensor of the control mechanism 3, with a view to controlling the opacity of the sun visor 20 (FIG. 4). The control unit 5 for example adjusts the opacity of the sun visor 20 to maintain a constant light level. Thus, for example, when driving during the day, the sun visor 20 automatically lightens when the vehicle 1 enters a tunnel and darkens when it leaves it.

FIGS. 5 to 8 illustrate a second exemplary embodiment of a control device 2.

In this example, the control mechanism 3 comprises an energy-harvesting means 22 (FIG. 6).

The energy-harvesting means 22 is configured to harvest the kinetic energy generated by the movement of the gripping element 6 in the form of electrical energy, in order to power a component of the control mechanism 3.

The energy-harvesting means 22 comprises for example an electromechanical transducer 23, such as at least one piezoelectric or inductive element.

For example, the movement of the gripping element 6 exerts a stress on the piezoelectric element of the electromechanical transducer 23, this allowing the kinetic energy generated to be harvested in the form of electrical energy.

The electromechanical transducer 23 may be connected to an energy storage unit 24 of the control mechanism 3, such as a capacitor, to store the harvested electrical energy.

The component of the control mechanism 3 for example comprises a transmitter 25, such as a radio or infrared transmitter, that may be powered by the electrical energy delivered by the energy-harvesting means 22. Thus, when it is powered, the transmitter 25 may transmit a signal relating to the position of the gripping element 6 to a complementary receiver 26 of the control unit 5 via a wireless link (FIG. 6).

Figure 7:
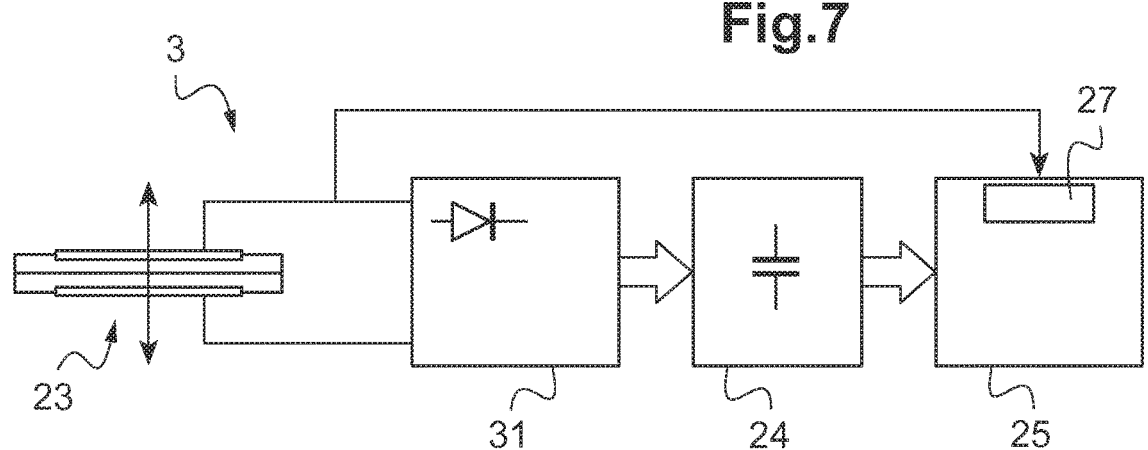
FIG. 7 shows a schematic view of a succession of steps of a method for controlling an on-board element of the motor vehicle by means of the control device of FIG. 5.

The transmission of the signal relating to the position of the gripping element 6 may be triggered when a stress is exerted on the gripping element 6, i.e. only when the user moves the gripping element 6 and an electrical pulse is generated as output from the electromechanical transducer 23. To this end, the electrical signal generated by the electromechanical transducer 23 may be connected to a device for triggering the transmission 27 of the transmitter 25, with a view to transmitting a signal on receipt of a pulse. It is thus possible to save the energy stored in the energy storage unit 25 (FIG. 7).

The wireless (radio or infrared) link between the control unit 5 and the encoder 9 allows the control mechanism 3 to be able to be placed anywhere on the glazing 4 or the mirror of the vehicle without a visible wired connection.

Furthermore, this allows the control mechanism 3 to be movable. To this end, the control mechanism 3 may comprise a means for removably fastening it to the motor vehicle 1, such as a suction cup, which is for example fastened to the rear of the guide 12.

The guide 12 of the control mechanism 3 may also be adhesively bonded to the glazing 4 or the mirror of the motor vehicle 1.

Figure 8:
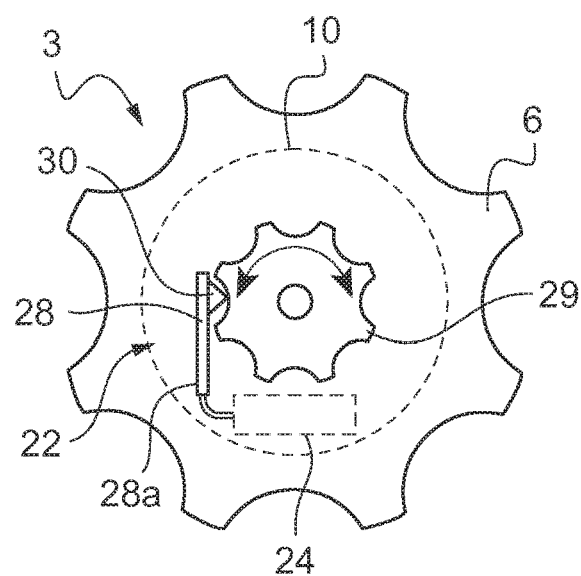
FIG. 8 shows a schematic view of an exemplary embodiment of a control mechanism of the control device of FIG. 5.

According to one exemplary embodiment that is shown in FIG. 8, the energy-harvesting means 22 comprises an elastic blade 28 bearing the piezoelectric element of the electromechanical transducer 23.

A first end 28*a* of the elastic blade 28 is fastened. It is for example fastened to the holder 11 or to the circuit board 10.

A second end of the elastic blade 28 is configured to interact with a cam 29 that rotates as one with the gripping element 6.

The cam 29 has a profile allowing the elastic blade 28 to be tensilely loaded before being abruptly released. The elastic blade 28 is thus made to vibrate by the rotation of the gripping element 6, with a view to charging the energy storage unit 24.

The profile of the cam 29 for example features a succession of notches that interact with a cam follower 30 borne by the second end of the elastic blade 28. An electrical pulse may thus be generated on each passage of a notch.

In operation, the rotation of the gripping element 6 causes the elastic blade 28 to vibrate, this charging the energy storage unit 24, for example after the voltage has been rectified via a rectifier 31, such as a diode-based rectifier, of the control mechanism 3 (FIG. 7).

The harvested electrical energy may make it possible to power the transmitter 25 with a view to transmitting the position of the gripping element 6 to the receiver 26 of the control unit 5 via a wireless link. A transmission of the signal is triggered when the gripping element 6 is manipulated, i.e. here when a stress is exerted on the piezoelectric element of the electromechanical transducer 23.

The control mechanism 3 may thus be "self-powered" via the effect of the vibrations induced in the electromechanical transducer 23 when it is rotated. The position of the control mechanism 3 is transmitted via a contactless link. The contactless signal is received and decoded by the receiver 26, which is for example located in the dashboard, or in any other place to which electrical cabling may be run in an unobtrusive way.

According to one exemplary application, on the basis of the angular position of the gripping element 6 and of the signal indicating the brightness behind the sun visor 20, which signal is generated by the brightness sensor 21, the control unit 5 determines the current to be delivered to the layer of electrochromic elements 18 of the electrochromic glass 16 to control the opacity of the sun visor 20.

According to another example, the manipulation of the control mechanism 3 allows the user to set the setpoint of an air-conditioning system. The setpoint is for example displayed on the screen 14 and the rotation of the control mechanism 3 allows the value of the setpoint to be increased or decreased. The choice may be validated by pressing on the control mechanism 3 or on a central button on the control mechanism 3.

According to another example, the manipulation of the control mechanism 3 allows the user to modify parameters relating to an on-board element 7 that is on board temporarily, i.e. that may be removed or added to the vehicle, such as a tow bar, a portable phone charger or a Bluetooth link.

According to another example, the manipulation of the control mechanism allows the user to adjust the height of the headlights or the brightness of the screens of the vehicle. This application may also be carried out with a control mechanism 3 connected to the control unit 5 by a wired link as described in the first exemplary embodiment.

The invention claimed is:

1. A control mechanism for a motor vehicle, comprising:
a gripping element that may be manipulated by a user to achieve control, such as control of an on-board element of said vehicle, the gripping element being mounted so as to be able to rotate on a guide of the control mechanism; and
an encoder configured to deliver a signal that is dependent on the position or on the variation in position of the gripping element,
wherein the guide is configured to be fastened to a glazing of the motor vehicle for a windshield or rear window, a side window or a glazed roof, or fastened to an internal rear-view mirror of said vehicle.

2. The control mechanism as claimed in claim 1, wherein the gripping element forms a cover covering the encoder and the guide, a gap between the end of the gripping element and the glazing or the internal rear-view mirror being less than five millimeters.

3. The control mechanism as claimed in claim 1, further comprising: an energy-harvesting means configured to harvest the kinetic energy generated by the movement of the gripping element in the form of electrical energy with a view to powering a component of the control mechanism.

4. The control mechanism as claimed in claim 3, wherein the component comprises a transmitter connected to the encoder for transmitting, via a wireless link, a signal relating to the position of the gripping element to a receiver of a control unit of the motor vehicle.

5. The control mechanism as claimed in claim 4, wherein the energy-harvesting means comprises an electromechanical transducer that is a piezoelectric element.

6. The control mechanism as claimed in claim 5, wherein the electromechanical transducer is connected to an energy storage unit of the control mechanism.

7. The control mechanism as claimed in claim 5, wherein the transmitter comprises a device for triggering transmission, said device being connected to the electromechanical transducer.

8. The control mechanism as claimed in claim 5, wherein the energy-harvesting means comprises an elastic blade bearing a piezoelectric element of the electromechanical transducer, a first end being fastened and a free second end being configured to interact with a cam that rotates as one with the gripping element.

9. The control mechanism as claimed in claim 1, wherein the control mechanism is connected to a control unit of the motor vehicle via a wired link, which is transparent or translucent.

10. The control mechanism as claimed in claim 1, wherein the guide is adhesively bonded to the glazing of the motor vehicle or to the internal rear-view mirror.

11. A control device for a motor vehicle, comprising:
at least one control mechanism as claimed in claim 1, the guide of which is configured to be fastened to a glazing of the motor vehicle or to an internal rear-view mirror of said vehicle; and
a control unit that is connected to said at least one control mechanism with a view to controlling an on-board element of said vehicle.

12. The control device as claimed in claim 11, wherein the guide of the control mechanism is configured to be fastened to a glazing or a mirror comprising an electrochromic glass, the control unit being configured to control the adjustment of the opacity of the electrochromic glass depending on the manipulation of the control mechanism.

13. The control device as claimed in claim 12, further comprising: a brightness sensor configured to measure the brightness in the passenger compartment of the motor vehicle, arranged behind an electrochromic glass of a sun visor, the brightness sensor being connected to the control unit with a view to automatically controlling the opacity of the sun visor.

14. The control device as claimed in claim 11, wherein the guide of the control mechanism is configured to be fastened to the windshield of the motor vehicle with a view to selection or validation of a function or of a parameter displayed on a screen.

15. The control device as claimed in claim 14, wherein the screen is projected onto said windshield by a head-up display of the control device.

16. The control device as claimed in claim 11, further comprising: an on-board element configured to be controlled by the control mechanism, the on-board element comprising an air-conditioning, ventilation or navigation system or a vehicle radio, a telephone or a means for controlling electric windows or for adjusting the position of the rear-view mirrors or for adjusting the height of the headlights or for adjusting the brightness of the screens of the vehicle, the on-board element being able to be on board temporarily.

17. A method for controlling an on-board element of the motor vehicle, comprising:
controlling an on-board element of said vehicle by manipulating a control mechanism as claimed in claim 1, the guide of which is fastened to a glazing of the motor vehicle, for a windshield or rear window, a side window, a glazed roof, or is fastened to an internal rear-view mirror of said vehicle.

18. The control method as claimed in claim 17, wherein a component of the control mechanism is powered by electrical energy harvested from kinetic energy generated by the movement of the gripping element.

19. The control method as claimed in claim 18, wherein the electrical energy powers a transmitter for transmitting, via a wireless link, the position of the gripping element of the control mechanism to a receiver of the control unit of the motor vehicle.

20. The control method as claimed in claim 19, wherein a transmission of the signal is triggered when the gripping element of the control mechanism is manipulated.

21. The control method as claimed in claim 17, wherein the manipulation of the control mechanism controls the opacity of an electrochromic glass of the glazing or an internal rear-view mirror of the motor vehicle to which the control mechanism is fastened.

22. The control method as claimed in claim 21, wherein the manipulation of the control mechanism allows access to a network of an electronic-toll, parking-payment or telephone operator, through the glazing to be controlled.

\* \* \* \* \*